United States Patent
Li et al.

(10) Patent No.: US 10,246,337 B2
(45) Date of Patent: Apr. 2, 2019

(54) SAFE AND LOW TEMPERATURE THERMITE REACTION SYSTEMS AND METHOD TO FORM POROUS SILICON

(71) Applicant: Battelle Memorial Institute, Richland, WA (US)

(72) Inventors: Xiaolin Li, Richland, WA (US); Ji-Guang Zhang, Richland, WA (US); Jun Liu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 62 days.

(21) Appl. No.: 15/436,027

(22) Filed: Feb. 17, 2017

(65) Prior Publication Data
US 2018/0237305 A1     Aug. 23, 2018

(51) Int. Cl.
*C01B 33/023*     (2006.01)

(52) U.S. Cl.
CPC ........ *C01B 33/023* (2013.01); *C01P 2002/72* (2013.01); *C01P 2004/03* (2013.01); *C01P 2004/04* (2013.01); *C01P 2006/12* (2013.01); *C01P 2006/40* (2013.01)

(58) Field of Classification Search
CPC .................................................. C01B 33/023
See application file for complete search history.

(56) References Cited

U.S. PATENT DOCUMENTS

| | | | |
|---|---|---|---|
| 2014/0377653 A1* | 12/2014 | Park ..................... | H01M 4/364 429/218.1 |
| 2017/0047584 A1* | 2/2017 | Hwang ............... | H01M 4/0471 |
| 2017/0141383 A1* | 5/2017 | Dadheech ............ | H01M 4/366 |
| 2017/0194631 A1* | 7/2017 | Favors ............. | H01M 10/0569 |

FOREIGN PATENT DOCUMENTS

| | | | |
|---|---|---|---|
| WO | WO 2017/162048 | * | 9/2017 |
| WO | WO 2017/214882 | * | 12/2017 |

OTHER PUBLICATIONS

Lin et al. "A low temperature molten salt process for aluminothermic reduction of silicon oxides to crystalline Si for Li-ion batteries" (2015).*
Bao et al, "Chemical Reduction of Three-Dimensional Silica Micro-Assemblies Into Microporous Silicon Replicas," *Nature* Mar. 8, 2007, vol. 446, pp. 172-175.
Luo et al., "Efficient Fabrication of Nanoporous Si and Si/Ge Enabled by a Heat Scavenger in Magnesiothermic Reactions," *Scientific Reports* Jul. 17, 2013, vol. 3, No. 2222, pp. 1-7.
Wang et al., "Monodisperse Porous Silicon Spheres as Anode Materials for Lithium Ion Batteries," *Scientific Reports* Mar. 5, 2015, vol. 5, No. 8781, pp. 1-6.
Zhang et al., "Development of Silicon-based High Capacity Anodes," *Presentation at 2016 DOE Vehicle Technologies Program Review*, Pacific Northwest National Laboratory, Jun. 6-10, 2016.

* cited by examiner

*Primary Examiner* — Austin Murata
(74) *Attorney, Agent, or Firm* — Klarquist Sparkman, LLP

(57) ABSTRACT

Embodiments of a safe, low-temperature reaction system and method for preparing porous silicon are disclosed. The porous silicon is prepared from porous silica, a low-melting metal halide, and a metal comprising aluminum, magnesium, or a combination thereof. Advantageously, embodiments of the disclosed methods can be performed at temperatures ≤400° C. Silicon produced by the disclosed methods has a porosity that is equal to or greater than the porous silica precursor. The porous silicon is suitable for use in electrodes.

12 Claims, 6 Drawing Sheets

SAFE AND LOW TEMPERATURE THERMITE REACTION SYSTEMS AND METHOD TO FORM POROUS SILICON

ACKNOWLEDGMENT OF GOVERNMENT SUPPORT

This invention was made with Government support under Contract DE-AC05-76RL01830 awarded by the U.S. Department of Energy. The Government has certain rights in the invention.

FIELD

Safe, low-temperature reaction systems and a method for forming porous silicon from porous silica are disclosed.

BACKGROUND

Silicon (Si), with a theoretical capacity of 3579 mA h/g (for Li3.5Si) has attracted enormous attention as high capacity anode material for rechargeable Li-ion batteries. However, fast capacity fade due to structural degradation (pulverization) has hampered its use. Nanostructured silicon materials can accommodate the volume changes produced by lithium intercalation/deintercalation. Nanostructured silicon has been prepared from silica and silicates under high-temperature reduction processes, such as by carbothermal reduction of silica at temperatures of at least 2000° C. Silicon has also been prepared by reduction of silica with magnesium vapor at 650° C. (Bao et al., Nature 2007, 446: 172). However, it is difficult to retain the desired microscale morphology of the silica reactant in silicon products obtained at high temperatures since pore collapse becomes problematic. Hence, a need exists for a safe, low-temperature method of producing porous silicon that retains the porous morphology of the starting material.

SUMMARY

Embodiments of a safe, low-temperature reaction system and method for preparing porous silicon are disclosed. The porous silicon is prepared from porous silica, a low-melting metal halide, and aluminum or magnesium.

A method for preparing porous silicon includes (a) forming a mixture comprising (i) porous silica, (ii) a metal comprising aluminum, magnesium, or a combination thereof, and (iii) a metal halide comprising a metal M, where the metal halide has a melting point≤400° C.; (b) heating the mixture in a sealed vessel at a temperature greater than or equal to the melting point of the metal halide and ≤400° C. under an inert atmosphere to form a product comprising porous silicon; and (c) combining the product with acid to remove any by-products from the porous silicon. In some embodiments, the porous silica has an initial Brunauer-Emmett Teller (BET) surface area as determined by nitrogen adsorption and the porous silicon has a BET surface area within a range of 1.0-1.8X the initial BET surface area of the porous silica.

In some embodiments, the metal M is Ti, Fe, Zn, Ga, Ge, Ag, Sn, Sb, Au, Hg, Tl, Bi, or a combination thereof. In certain embodiments, the metal M is Zn, Fe, Sn, Sb, Ti, or a combination thereof.

In any or all of the above embodiments, the metal halide may be a metal chloride, metal bromide, metal iodide, or a combination thereof. In some embodiments, the metal halide is a metal chloride, e.g., $ZnCl_2$, $FeCl_3$, $SnCl_2$, $SbCl_3$, $TiCl_4$, or a combination thereof. When the metal chloride is $ZnCl_2$, $FeCl_3$, $SnCl_2$, or $SbCl_3$, the temperature may be within a range of from 250° C. to 350° C.

In any or all of the above embodiments, the mixture may be heated for a period of time within a range of from one hour to 24 hours to form the porous silicon. In any or all of the above embodiments, the acid may be hydrochloric acid, sulfuric acid, nitric acid, phosphoric acid, acetic acid, or a combination thereof, such as 0.1-6 M HCl.

The porous silicon is suitable for use in electrodes. A method for making an electrode includes making porous silicon according to any of the foregoing embodiments, coating the porous silicon with carbon to produce carbon-coated porous silicon, forming a slurry comprising the carbon-coated porous silicon, and drying the slurry to form an electrode. Forming the slurry may comprise combining the carbon-coated porous silicon with a binder and a liquid, such as water. In some embodiments, the slurry comprises 10-90 wt % carbon-coated silicon based on a total mass of solids in the slurry. The method may further comprise including conductive carbon in the slurry. Electrodes prepared by any or all embodiments of the foregoing method may comprise up to 99 wt % carbon-coated silicon, as low as 0 wt % carbon black, and as low as 1 wt % binder. Some embodiments of the electrode have (i) a reversible specific capacity of 1500-2500 mAh/g at a current density of 1 A/g based on the mass of carbon-coated silicon in the electrode; (ii) a capacity retention of at least 80% over 100 cycles; or (iii) both (i) and (ii).

The foregoing and other objects, features, and advantages of the invention will become more apparent from the following detailed description, which proceeds with reference to the accompanying figures.

DETAILED DESCRIPTION

Figure 1:
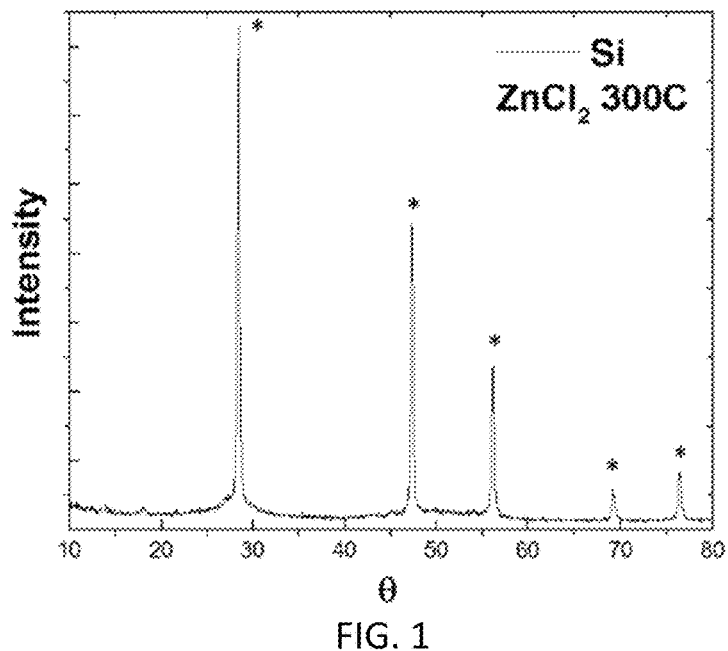
FIG. 1 is an X-ray diffraction spectrum of silicon obtained with a $SiO_2$—Al—$ZnCl_2$ system after HCl washing.

Embodiments of a safe, low-temperature reaction system and method for preparing porous silicon are disclosed. The porous silicon is prepared from porous silica, a low-melting metal halide, and aluminum or magnesium. Advantageously, embodiments of the disclosed methods can be performed at temperatures less than or equal to 400° C. Silicon produced by the disclosed methods has a porosity that is equal to or greater than the porous silica precursor.

The silicon product is suitable for use as an electrode material. In some embodiments, electrodes comprising carbon-coated silicon produced by the methods disclosed herein provide reversible specific capacities of at least 1500 mAh/g at 1 A/g based on the mass of carbon-coated silicon, and/or exhibit a capacity retention of at least 80% over 100 cycles in a coin cell with lithium metal as the counter and reference electrodes.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, surface areas, pore sizes, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

BET: Brunauer-Emmett-Teller; a method for determining surface area of a sample based on adsorption of gas, typically nitrogen, on a surface. The amount of gas adsorbed at a given pressure is used to determine the surface area. Solid samples typically are pretreated (e.g., by heat, vacuum, and/or flowing gas) to remove contaminants. The solid sample is then cooled under vacuum to 77 K (−196° C.). An adsorptive gas, e.g., nitrogen, is introduced in incremental amounts. After each introduction, the pressure is allowed to equilibrate, and the amount of adsorbed gas is calculated. The amounts are plotted to provide an adsorption isotherm, from which the quantity of gas required to form a monolayer over the solid surface is determined. Based on the gas quantity and the size of the gas molecules, the surface area of the solid is calculated.

Barrett-Joyner-Halenda method: A method for calculating pore size distributions from experimental isotherms based on nitrogen desorption using the Kelvin model of pore filling to relate the amount of adsorbed gas removed from the pores, as the relative pressure is decreased from a relatively high value to a low value, to the size of the pores.

By-product: As used herein, the term "by-product" refers to products other than silicon produced by embodiments of the disclosed product. Exemplary by-products include, but are not limited to, metals other than silicon, metal oxides, metal halides, and metal oxyhalides (e.g., AlOCl).

Carbon black: A finely divided form of carbon, typically made by incomplete combustion of vaporized heavy oil fractions. Carbon black can also be made from methane or natural gas by cracking or combustion.

Crystallite: An individual crystal or region or regular crystalline structure in the substance of a material, such as a metal. A nanocrystallite is a crystallite having a largest dimension of about 100 nm or less.

Current density: As used herein, current density refers to the amount of current per unit mass. Current density is typically expressed in units of A/g or mA/g.

Graphitized carbon: As defined by IUPAC, graphitized carbon is a graphitic carbon (carbon in the allotropic form of graphite) with more or less perfect three-dimensional hexagonal crystalline order prepared from nongraphitic carbon by graphitization heat treatment, i.e., heat treatment at a temperature within a range of 2500-3300 K (*IUPAC Compendium of Chemical Terminology*, 2nd ed. (the "Gold Book"), compiled by A. D. McNaught and A. Wilkinson, Blackwell Scientific Publications, Oxford (1997). XML on-line corrected version: http://goldbook.iupac.org (2006-) created by M. Nic, et al.; updates compiled by A. Jenkins. ISBN 0-9678550-9-8. doi:10.1351/goldbook, updated Feb. 24, 2014, version 2.3.3). As used herein, graphitized carbon refers to graphitic carbon with a graphite-type structure content within a range of from 20 to 99% by weight, such as from 50 to 99% or from 80-95% by weight.

Melting point: The melting point is the temperature, or temperature range, at which a substance transitions from a solid to a liquid or vice versa. Melting points for inorganic compounds can be found in numerous references including, but not limited to, the *CRC Handbook of Chemistry and Physics* $97^{th}$ *Ed.* or the *Handbook of Inorganic Compounds* $2^{nd}$ *Ed.*, CRC Press. Melting points also can be determined empirically by any suitable means, including by use of a melting point apparatus. With respect to the present disclosure, a suitable melting point apparatus has a temperature range up to 400° C. (e.g., an MP90 melting point system, Mettler-Toledo, LLC, Columbus, Ohio; 1101 D or 1102D Mel-Temp® melting point apparatus; Bibby Scientific Ltd, UK). Melting is determined visually (e.g., by visualizing when solid and liquid phases co-exist and documenting the corresponding temperature), or by measuring the temperature of the substance as the temperature of a melting point apparatus in which a sample of the substance is placed rises; melting is indicated by a plateau in the substance temperature as the melting point apparatus temperature continues to rise. The center of the plateau is selected as the melting point, or the melting point is reported as a temperature range over which melting occurs, i.e., the temperature range of the melting point apparatus corresponding to the observed temperature plateau of the substance. For purposes of this disclosure, when a melting point temperature range is reported, the center of the range is taken as the melting point.

Metal: An element that forms positive ions when its compounds are in solution and whose oxides form hydroxides with water. As used herein, the term metal also encompasses metalloids (solid elements whose properties are intermediate between those of metals and solid nonmetals, e.g., B, Si, Ge, As, Sb, and Te).

Pore: One of many openings or void spaces in a solid substance of any kind. Pores are characterized by their diameters. According to IUPAC notation, micropores are small pores with diameters less than 2 nm. Mesopores are mid-sized pores with diameters from 2 nm to 50 nm. Macropores are large pores with diameters greater than 50 nm. Porosity is a measure of the void spaces or openings in a material, and is measured as a fraction, between 0-1, or as a percentage between 0-100%.

Porous: A term used to describe a matrix or material that is permeable to fluids (such as liquids or gases). For example, a porous matrix is a matrix that is permeated by a network of pores (voids) that may be filled with a fluid. In some examples, both the matrix and the pore network (also known as the pore space) are continuous, so as to form two interpenetrating continua. A nanoporous material has pores that generally have diameters of 100 nm or smaller. Nanoporous materials may be subdivided into three categories according to IUPAC notation: microporous materials (pore size 0.2-2 nm), mesoporous materials (pore size 2-50 nm), and macroporous materials (pore size 50-1000 nm).

Slurry: A fluid or semi-fluid mixture comprising insoluble solid particles and a liquid.

Specific capacity: A term that refers to capacity per unit of mass of the electrode (or active material). As used herein, the specific capacity is capacity per unit of mass of carbon-coated silicon. Specific capacity may be expressed in units of mAh/g.

Specific areal capacity: A term that refers to capacity per unit of area of the electrode (or active material). Specific areal capacity may be expressed in units of mAh/cm².

Thermite reaction: Originally, the term "thermite reaction" referred to a mixture of ferric oxide and powdered aluminum, which was ignited with a magnesium ribbon. As used herein, the term "thermite reaction" refers to an exothermic oxidation-reduction reaction including a metal halide, silica, and a fuel (e.g., aluminum or magnesium) wherein silica is reduced to Si. The reactions may also be referred to as aluminothermic or magnesiothermic reactions.

II. Method of Making Porous Silicon and Electrodes

A safe, low temperature thermite reaction system and method for preparing porous silicon from a silica precursor ($SiO_x$ where x is ≤2) are disclosed. Embodiments of the disclosed method comprise an aluminothermic or magnesiothermic reaction. Advantageously, sensitive and/or reactive components such as $AlCl_3$ are generated in situ at low temperatures (≤400° C.), thereby reducing the difficulties and hazards associated with handling and use of $AlCl_3$ as a reactant. The low temperature also provides enhanced control over the product properties compared to high-temperature processes, providing a porous silicon that has a similar morphology and/or a similar or improved porous structure (e.g., pores of similar or greater size) compared to the silica precursor.

The reaction system includes porous silica, a low-melting metal halide (e.g., having a melting point≤400° C.) comprising a metal M, and a fuel such as aluminum or magnesium. The method includes forming a mixture comprising, consisting essentially of, or consisting of (i) porous silica, (ii) a metal comprising aluminum, magnesium, or a combination thereof, and (iii) a metal halide comprising a metal M, the metal halide having a melting point≤400° C. When the melting point of the metal halide is a temperature range, the mid-point of the temperature range is ≤400° C. The term "consisting essentially of" means that the mixture does not include more than trace amounts (i.e., less than 1 wt %) of other components capable of reacting with silica or with the Al or Mg at temperatures≤400° C. In some embodiments, the mixture is heated in a sealed vessel at a temperature greater than or equal to the melting point of the metal halide and ≤400° C. under an inert atmosphere to form a product comprising porous silicon. The product is combined with acid to remove any by-products from the porous silicon. The product may be cooled before it is combined with acid.

In an independent embodiment, the mixture is subjected to high-energy ball milling. In this process, Mg and SiO2 with an appropriate ratio are added to a milling container. The container is tightened under an inert atmosphere (e.g., in Ar filled glove box) before being placed in a mill (such as 8000M Mixer/Mill made by SPEX SamplePreo Inc., NJ). The sample is then milled for 1 hour or longer at ambient temperature (e.g., 20-25° C.) to form a product comprising porous silicon and by-products. The product is washed with acid to remove the by-products from the porous silicon.

A general, nonstoichiometric equation for the reaction may be expressed as:

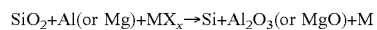

$$SiO_2 + Al(\text{or Mg}) + MX_x \rightarrow Si + Al_2O_3 (\text{or MgO}) + M$$

where M is a metal, X represents a halogen, and x is an integer of 1 or greater as needed to balance the positive charge on the metal M. Without wishing to be bound to a particular theory of operation, Al or Mg initially reacts with $MX_x$ to produce M and $AlX_3$ or $MgX_2$. The $AlX_3$ or $MgX_2$ along with additional Al or Mg reacts with $SiO_2$ to provide Si and $Al_2O_3$ or MgO. AlOX also may form as a by-product when aluminum is used.

In some embodiments, the metal M is Ti, Fe, Zn, Ga, Ge, Ag, Sn, Sb, Au, Hg, Tl, Bi, or a combination thereof. In certain embodiments, the metal M is Zn, Fe, Sn, Sb, Ti, or a combination thereof. The metal halide may be a metal chloride, metal bromide, or metal iodide. Advantageously, the metal halide has a melting point no greater than 400° C. In certain examples, the metal halide is a metal chloride. Exemplary metal chlorides include $ZnCl_2$, $FeCl_3$, $SnCl_2$, $SbCl_3$, $TiCl_4$, or a combination thereof.

The temperature at which the reaction occurs is greater than or equal to the melting point of the metal halide (as reported in melting point reference tables or measured using a melting point apparatus) and 400° C. In some embodiments, the temperature is at least 10° C., at least 20° C., or at least 50° C. higher than the melting point of the metal halide, but no higher than 400° C. The temperature may be, for example, within a range of 200-400° C., such as 200-350° C., or 250-350° C. In some embodiments, the metal halide is $ZnCl_2$, $FeCl_3$, $SnCl_2$, or $SbCl_3$, and the temperature is within a range of from 250° C. to 350° C., such as 275-325° C. In certain examples, the temperature was 300° C.

The mixture is heated under an inert atmosphere for a period of time to reduce the silica to silicon. Suitable inert atmospheres include argon or helium. The period of time may be within a range of from one to 24 hours, such as 2-20 hours, 5-18 hours or 10-15 hours. In some examples, the inert atmosphere was argon and the period of time was 12 hours.

The product of certain embodiments comprising porous silicon is combined with acid to remove any by-products (e.g., metal halides, metal oxides, metal oxyhalides, metals other than silicon) that may be present. Suitable acids may include binary acids, such as HCl or HF, sulfuric acid, nitric acid, phosphoric acid, acetic acid, and combinations thereof. The acid has a concentration within a range of from 0.1 M to as high as the saturated concentration of the respective acids. In some embodiments, the acid is a dilute acid, e.g., an acid having a concentration of less than or equal to 6M. The typical acid concentration can be from 0.1-6 M, 0.1-3 M, 0.1-2 M, 0.5-1.5 M, or 0.7-1.2 M. In certain examples, the acid was 1 M HCl. The product may be cooled, e.g., to <100° C., such as to ambient temperature, before adding acid to the product. Sonication before or during the acid wash may be used to separate the silicon particles.

Generally, the components are combined in ratios such that porous silica is the limiting reactant. For example, when the reactants include silica, aluminum, and zinc chloride, the proposed reaction mechanism is:

$$2Al+3ZnCl_2 \rightarrow 2AlCl_3+3Zn$$

$$4Al+3SiO_2+2AlCl_3 \rightarrow 6AlOCl+3Si$$

$$4Al+3SiO_2 \rightarrow 2Al_2O_3+3Si$$

thereby producing an overall reaction of:

$$10Al+3ZnCl_2+6SiO_2 \rightarrow 6AlOCl+2Al_2O_3+3Zn+6Si.$$

In some embodiments, the reactants are combined in a molar ratio of 1 mole silica, at least two moles metal, and at least 1 mole metal halide. In certain embodiments, the reactants are combined in a molar ratio of 1 mole silica, 2-6 moles metal, and 1-6 moles metal halide. For example, the reactants may be combined in a molar ratio of 1 mole silica, 3-4 moles metal, and 2-4 moles metal halide. When the metal is Al and the metal halide is $ZnCl_2$ as shown in the exemplary reaction above, the reactants may be combined in a ratio of 1 part silica, 1.5-2 parts metal, and 6-10 parts metal halide by weight, such as a $SiO_2$:Al:$ZnCl_2$ weight ratio of 1:1.6:8. In the foregoing embodiments, the metal halide may be other than an iron halide.

In some examples, when the metal halide is an iron halide, iron may be the limiting reactant. The overall reaction when $FeCl_3$ is the metal halide is:

$$5Al+FeCl_3+3SiO_2 \rightarrow 3Si+Fe+AlCl_3+2Al_2O_3.$$

Silicon formed during the reaction can react with iron to form $Fe_2Si$, thereby reducing the yield of nanoporous silicon. By limiting the iron, the yield of nanoporous silicon is improved. Thus, in some embodiments, when the metal halide is an iron halide, the reactants may be combined in a molar ratio of 1 mole silica, less than 0.33 mole iron halide (such as 0.2-0.3 mole iron halide), and at least two moles metal.

Advantageously, the low operating temperatures of certain embodiments of the disclosed methods facilitate retention of the morphology and porous structure of the silica as the silica is reduced to silicon. While the morphology remains similar, the pores may increase in size as the oxygen is removed from the silica. Thus, the porous silicon may have a porosity greater than or equal to the silica porosity and a surface area greater than or equal to the silica surface area. In some embodiments, the porous silica has an initial Brunauer Emmet Teller (BET) surface area as determined by nitrogen adsorption, and the porous silicon has a BET surface area within a range of 1.0-1.8X the initial BET surface area of the silica. In certain embodiments, the porous silicon has a BET surface area within a range 1.4-1.6X the initial silica BET surface area. For example, when the silica precursor has a BET surface area of 100 m$^2$/g, the resulting silicon may have a BET surface area within a range of 100-180 m$^2$/g, such as a surface area from 140-160 m$^2$/g. In some embodiments, the silica and resulting silicon are nanoporous. After reduction of the silica to silicon, however, the pores are typically larger in the silicon. The average pore size in the silicon may be, for example at least 5%, at least 10%, or at least 15% larger than the average pore size of the silica precursor. As a result, when the silica is mesoporous, the silicon product may be macroporous. In some embodiments, the silicon pore sizes are ≥10 nm in the largest cross-sectional dimension, such as from 10-1000 nm, 10-100 nm, or 50-100 nm. In certain examples, the silica has a pore volume within a range of 0.5-1.5 cm$^3$/g, such as from 0.8-1.2 cm$^3$/g, and the resulting silicon has a pore volume within a range of 0.7-1.7 cm$^3$/g, such as from 1.0-1.4 cm$^3$/g. In some embodiments, the porous silicon is nanocrystalline and/or comprises particles that are generally spherical. The porous silicon may comprise nanocrystallites having an average size of ≤50 nm, ≤30 nm, or ≤20 nm in the largest dimension, such as an average size of 5-50 nm, 5-30 nm, or 5-20 nm. In certain examples, the nanocrystallites have an average size of ≤20 nm.

The porous silicon is suitable for making electrodes. In some embodiments, a method for making an electrode includes (i) forming the porous silicon as disclosed herein; (ii) coating the porous silicon with carbon to produce carbon-coated porous silicon, (iii) forming a slurry comprising the carbon-coated porous silicon, and (iv) drying the slurry to form an electrode. In some embodiments, forming the slurry comprises combining the carbon-coated porous silicon with a binder and a liquid, such as water. The slurry may be coated onto a support, e.g., copper foil, prior to drying. The slurry may further include conductive carbon, such as carbon black, hard carbon (carbon that cannot be graphitized and remain disordered after thermal treatment), or graphitized carbon. In certain examples, the carbon black is a conductive carbon black having a BET surface area within a range of 50-70 m$^2$/g and/or a density within a range of 140-180 kg/m$^3$.

Carbon coating may be performed by any suitable method including, for example, chemical vapor deposition (CVD). In some examples, carbon coating is performed by vacuum CVD with a precursor gas comprising acetylene and an inert gas (e.g., argon).

Suitable binders include, but are not limited to, carboxymethyl cellulose sodium salt (Na-CMC), polyvinylidene difluoride (PVdF), poly(acrylic acid) (PAA), and cross-linked PAA-CMC. In some examples, the binder is Na-CMC. In some embodiments, the slurry comprises from 10-90 wt % (such as 20-90 wt %, 40-80 wt %, or 60-80 wt %) carbon-coated silicon based on a total mass of solids in the slurry, a binder, and sufficient water to form a spreadable slurry. The slurry may be dried under any suitable conditions to remove water. In some embodiments, the slurry is dried under vacuum at a temperature of from 50-90° C., such as a temperature from 60-80° C.

The resulting electrode may comprise up to 99 wt % carbon-coated silicon and as low as 1 wt % binder, or up to 98 wt % carbon-coated silicon and as low as 2 wt % binder. The electrode may further include conductive carbon. In certain embodiments, the resulting electrode comprises, consists essentially of, or consists of from 60-80 wt % carbon-coated silicon, from 0-20 wt % carbon black, and from 10-30 wt % binder, or from 65-75 wt % carbon-coated silicon, from 5-15 wt % carbon black, and from 15-25 wt % binder. With respect to the electrode, "consists essentially of" means that the electrode does not include more than a trace amount (i.e., less than 1 wt %) of any other conductive, electrochemically active component, or component suitable for lithium intercalation/deintercalation, excluding any support on which the electrode is formed. In certain examples, the dried electrode comprises 70 wt % carbon-coated silicon, 10 wt % carbon black, and 20 wt % Na-CMC.

Embodiments of the disclosed electrodes are suitable for use as anodes in lithium ion batteries. The electrode may have a reversible specific capacity of at least 1500 mAh/g at a current density of 1 A/g based on the mass of carbon-coated silicon in the electrode, and/or a capacity retention of at least 80% over 100 cycles at a current density of 1 A/g (following three initial cycles at 100 mA/g). In some embodiments, the electrode has a reversible specific capacity of at least 1500 mAh/g based on the mass of carbon-coated silicon in the electrode, at least 1800 mAh/g or at least 2000 mAh/g, such as a reversible specific capacity of 1500-2500 mAh/g, 1800-2200 mAh/g or 2000-2200 mAh/g at a current density of 1 A/g based on the mass of carbon-coated silicon in the electrode. The electrode may have a reversible specific areal capacity of at least 0.5 mAh/cm$^2$ or at least 0.6 mAh/cm$^2$, such as a reversible specific areal capacity within a range of 0.5-0.8 mAh/cm$^2$. In some embodiments, the capacity retention is ≥70% after 100 cycles relative to the initial coulombic efficiency. Following three initial cycles at 100 mAh/g, the capacity retention may be ≥80%, ≥82%, or even ≥85% over 100 cycles at a current density of 1 A/g based on the mass of carbon-coated silicon in the electrode. In some embodiments, the capacity retention is 80-90% or 85-90% over 100 cycles at a current density of 1 Ng based on the mass of carbon-coated silicon in the electrode.

III. EXAMPLES

Preparation Example 1

Nanoporous Si was prepared via a modified aluminothermic reaction with $ZnCl_2$ as the molten salt (melting point 290° C.). Porous silica with desired porosity and pore size was mixed with $ZnCl_2$ and Al metal with the ratio of ~1:8:1.6 by weight. The mixture was sealed in a Swagelok® reactor and heated in a tube furnace at 300° C. for 12 h under an argon atmosphere. After cooling to room temperature, the obtained products were first immersed in $H_2O$ and subsequently in 1M HCl to remove by-products. Finally, the products were collected, washed with $H_2O$ and ethanol, and vacuum-dried at 60° C. overnight.

Preparation Example 2

Nanoporous Si was prepared via a modified aluminothermic reaction with $SnCl_2$ as the molten salt (melting point 250° C.). Porous silica with desired porosity and pore size was mixed with $SnCl_2$ and Al metal with the ratio of ~1:10:2 by weight. The mixture was sealed in a Swagelok® reactor and heated in a tube furnace at 300° C. for 12 h under an argon atmosphere. After cooling to room temperature, the obtained products were first immersed in $H_2O$ and subsequently in 1M HCl to remove by-products. Finally, the products were collected, washed with $H_2O$ and ethanol, and vacuum-dried at 60° C. overnight.

Preparation Example 3

Nanoporous Si was prepared via a modified aluminothermic reaction with $SbCl_3$ as the molten salt (melting point 73.4° C.). Porous silica with desired porosity and pore size was mixed with $SbCl_3$ and Al metal with the ratio of ~1:7.8:2 by weight. The mixture was sealed in a Swagelok® reactor and heated in a tube furnace at 300° C. for 12 h under an argon atmosphere. After cooling to room temperature, the obtained products were first immersed in $H_2O$ and subsequently in 1M HCl to remove by-products. Finally, the products were collected, washed with $H_2O$ and ethanol, and vacuum-dried at 60° C. overnight.

Preparation Example 4

Nanoporous Si was prepared via a modified aluminothermic reaction with $FeCl_3$ as the molten salt (melting point 306° C.). Porous silica with desired porosity and pore size was mixed with $FeCl_3$ and Al metal with the ratio of ~2:1:2.4 by weight. In this example, $FeCl_3$ was limiting with respect to silica because silicon can react with excess iron to form $Fe_2Si$, thereby reducing the yield of nanoporous silicon. The mixture was sealed in a Swagelok® reactor and heated in a tube furnace at 330° C. for 12 h under an argon atmosphere. After cooling to room temperature, the obtained products were first immersed in $H_2O$ and subsequently in 1M HCl to remove by-products. Finally, the products were collected, washed with $H_2O$ and ethanol, and vacuum-dried at 60° C. overnight.

Carbon coating was conducted using a vacuum CVD system. Each of the nanoporous Si samples prepared above was loaded in a tube furnace, which then was evacuated at room temperature to a vacuum level of ≤1 mTorr. The furnace was heated to 600° C. at a rate of 10° C./min, and when at 600° C., the precursor gas (argon: acetylene=9:1) was introduced. The furnace temperature was increased to 690° C. and maintained at that temperature for 30 minutes. After carbon deposition, the furnace was cooled to room temperature in pure argon.

Characterization:

XRD spectra were obtained on a Philips X'Pert X-ray diffractometer (available, e.g., from PANalytical, B.V., The Netherlands) using a Cu $K_\alpha$ sealed tube (λ=1.54178 Å) at 0.5°/min. SEM measurements were conducted on an FEI Helios Nanolab™ DualBeam™ focused ion beam scanning electron microscope (FIB/SEM) (FEI, Hillsboro, Oreg.). After cycling, the samples were obtained from disassembled cells, washed three times with anhydrous diethyl carbonate, and dried in the antechamber of the glove box under vacuum. TEM and HRTEM measurements were performed using an FEI Titan™ 80-300 microscope (FEI, Hillsboro, Oreg.) operating at an accelerating voltage of 300 kV. Nitrogen sorption isotherms were obtained using a Quantachrome Autosorb® automated gas sorption system (Quantachrome Instruments, Boynton Beach, Fla.) at −196° C. Specific surface areas and pore size distributions were calculated using the Brunauer-Emmett-Teller theory and the Barrett-Joyner-Halenda method. Nitrogen was absorbed and desorbed onto the samples, and Brunauer-Emmett-Teller (BET) specific surface area values of the samples were calculated through differences in amounts of nitrogen absorbed and desorbed onto the samples. Specific pore volumes were measured at a relative pressure of 0.99.

Electrode Preparation and Electrochemical Measurement:

Electrodes were prepared by mixing an appropriate amount of the carbon-coated porous Si sample with Super P® conductive carbon black (Timcal), and carboxymethyl cellulose sodium salt (Na-CMC, Sigma Aldrich, St. Louis, Mo.) in distilled water to form a slurry, which was then pasted on a copper foil (Pred. Materials International, Inc., New York, N.Y.). The Si loading in the mixture was kept at ~70 wt % carbon-coated silicon. The amount of Super P® conductive carbon black was 10 wt %. The binder of Na-CMC was kept at 20 wt % in all electrodes. After drying in vacuum at 70° C., the electrodes were tested in coin cells with Li metal as the counter and the reference electrode. The electrolyte was 1M $LiPF_6$ in a mixture of ethylene carbonate and diethyl carbonate in a 1:1 weight ratio with 10 wt % fluorinated ethylene carbonate as electrolyte additive. A microporous membrane (Celgard® 3501, Celgard, LLC, Charlotte, N.C.) was used as the separator. The coin cells were assembled in an argon-filled glove box (MBraun Inc., Stratham, N.H.). All the batteries were tested using galvanostatic charge-discharge protocols on a BT-2000 Arbin® Battery Testing System (Arbin Instruments, College Station, Tex.) at room temperature. All tests were conducted within a voltage range of 0.005 to 1.0 V. The batteries were cycled at a current density of 100 mA/g for three cycles and then cycled at 1 A/g for charge and discharge.

Figure 2:
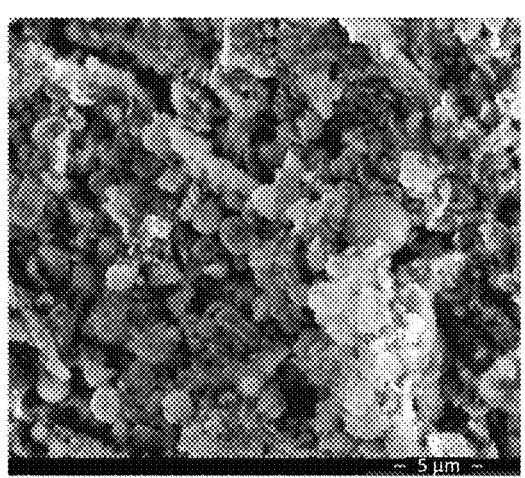
FIG. 2 is a scanning electron microscopy (SEM) image of the silicon of FIG. 1 at 10,000× magnification; the size bar is 5 μm.
Figure 3:
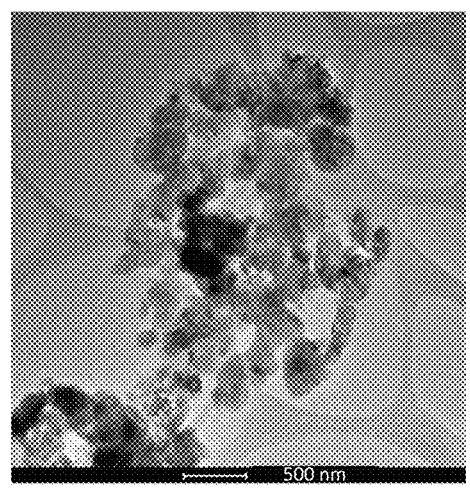
FIG. 3 is a transmission electron microscopy (TEM) image of the silicon of FIG. 1; the size bar is 500 nm.

Results:

X-ray diffraction demonstrated that the Si obtained using the $SiO_2$—Al—$ZnCl_2$ system after HCl washing is pure phase crystalline Si (FIG. 1). FIG. 2 is an SEM image showing that the obtained Si has spherical morphology similar to the porous $SiO_2$ precursors with a size of ~3 microns. The image also shows some broken particles. FIG. 3 is a TEM image showing that the Si has a porous structure with pores sizes of tens of nanometers surrounded by many nanocrystalline particles having sizes of tens of nanometers.

Figure 4A:
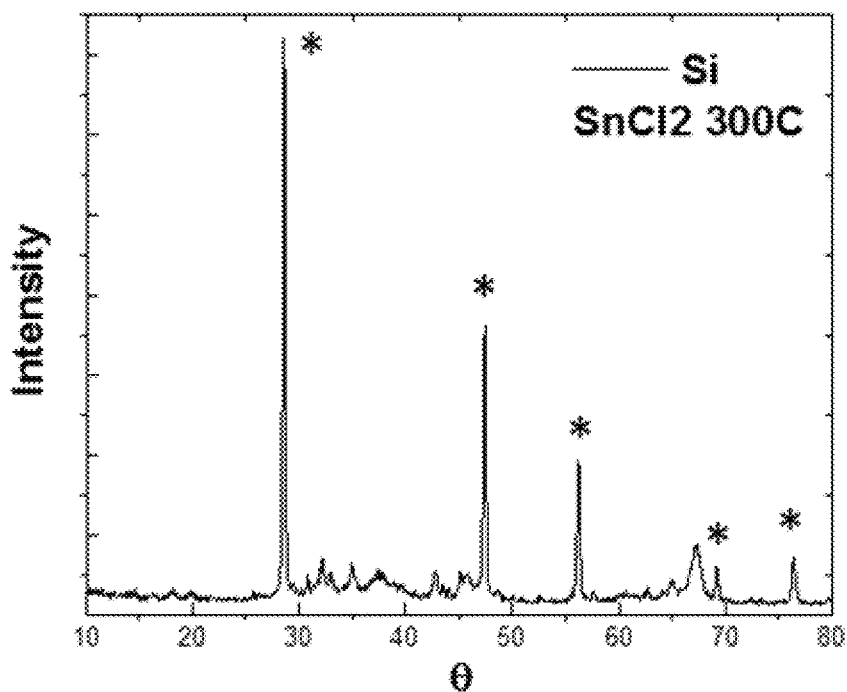
FIGS. 4A-4C are X-ray diffraction spectra of silicon obtained using a $SiO_2$Al—$SnCl_2$ system (4A), a $SiO_2$—Al—$SbCl_3$ system (4B), and a $SiO_2$—Al—$FeCl_3$ system (4C).
Figure 4B:
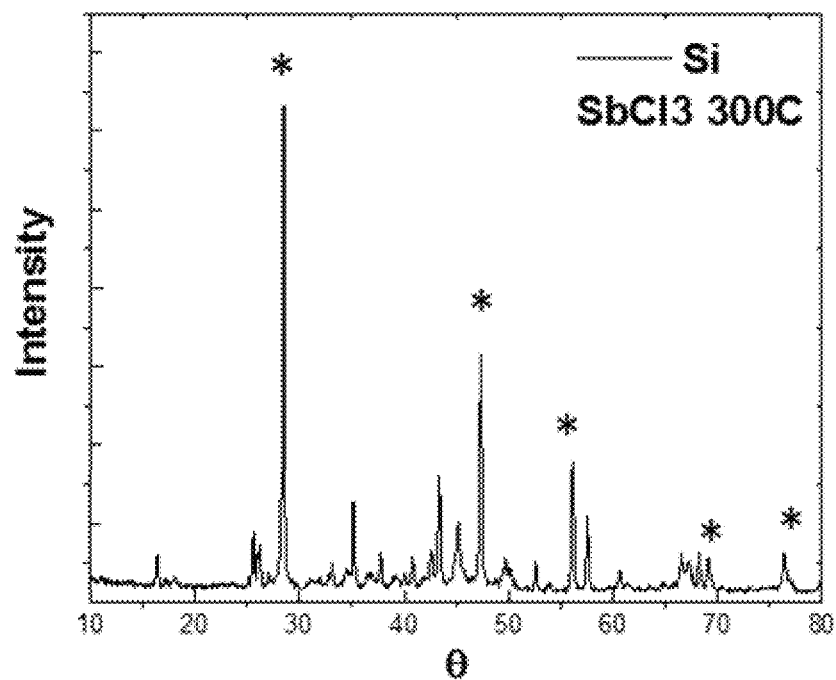
Figure 4C:
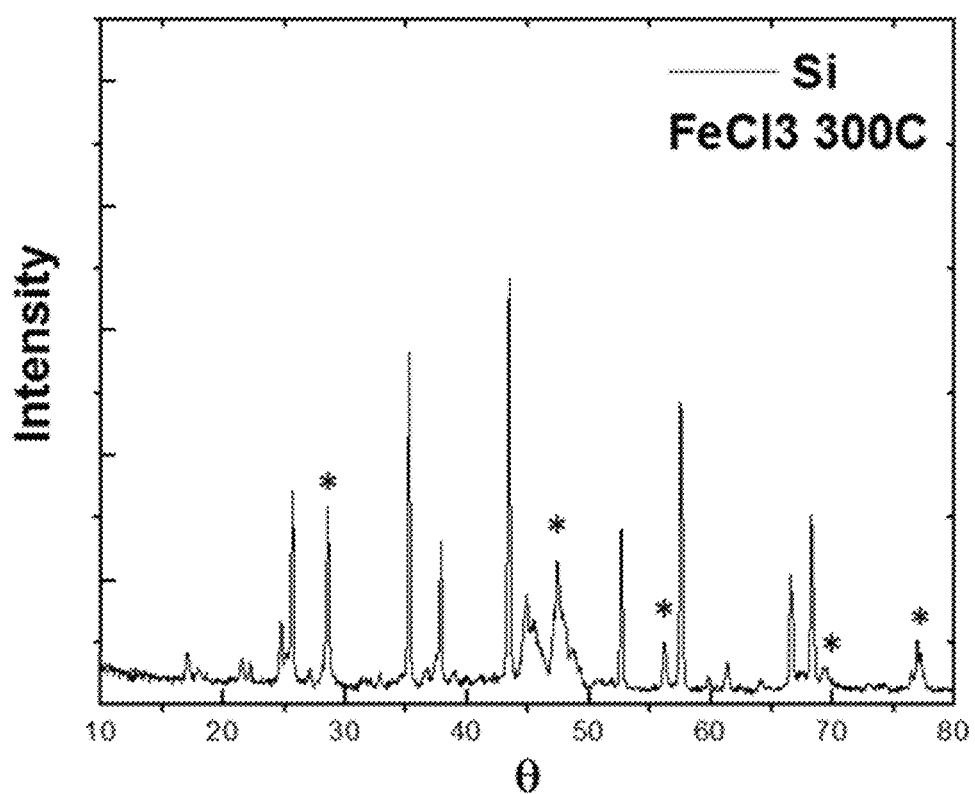

X-ray diffraction demonstrated that the Si obtained using the $SiO_2$—Al—$SnCl_2$ system after HCl washing is dominated by crystalline Si (FIG. 4A). X-ray diffraction demonstrated that the Si obtained using the $SiO_2$—Al—$SbCl_3$ system after HCl washing is dominated by Si with impurities of $Al_2O_3$ corundum and $Al_2SiO_5$ (FIG. 4B). X-ray diffraction demonstrated that the Si obtained using the $SiO_2$—Al—$FeCl_3$ system after HCl washing is a mixed phased of Si, $Al_2O_3$ corundum, and $Fe_2Al_3Si_3$ (FIG. 4C).

Figure 5B:
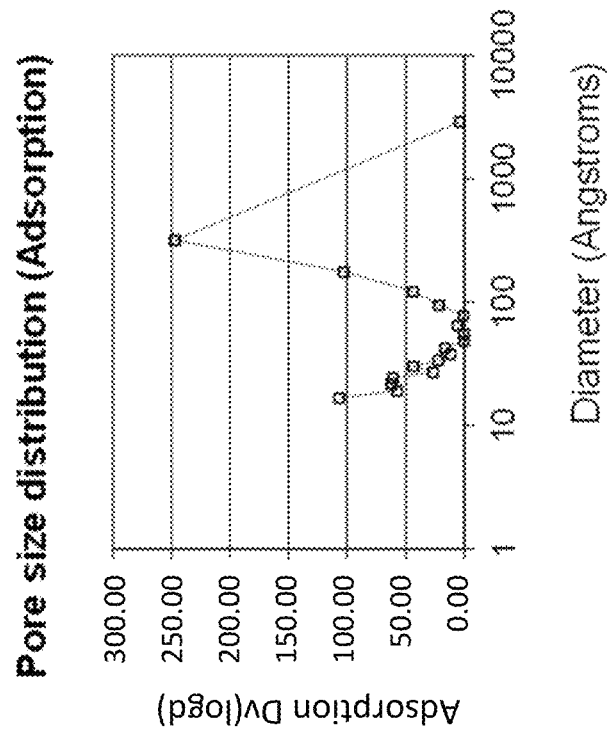
FIGS. 5A and 5B show the isothermal curve and pore size distribution, respectively, of porous silica.
Figure 5A:
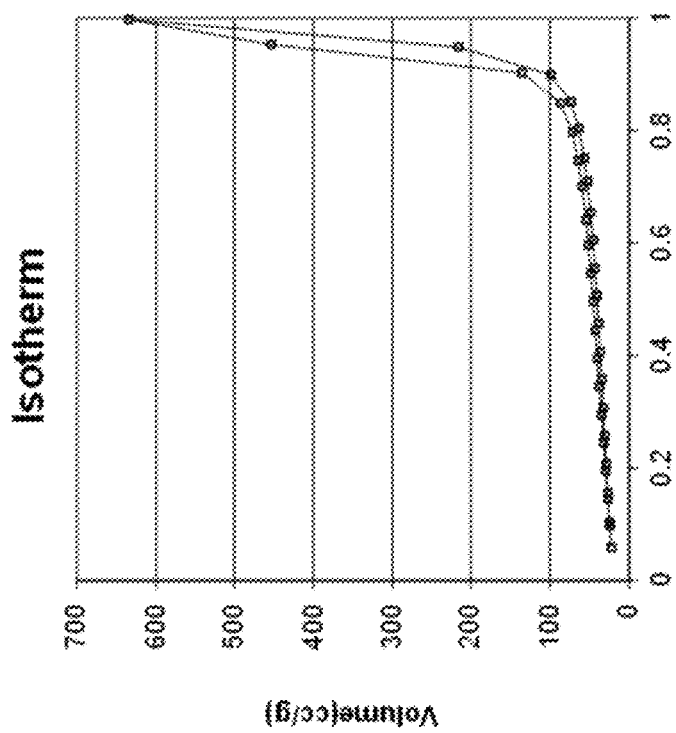
Figure 6B:
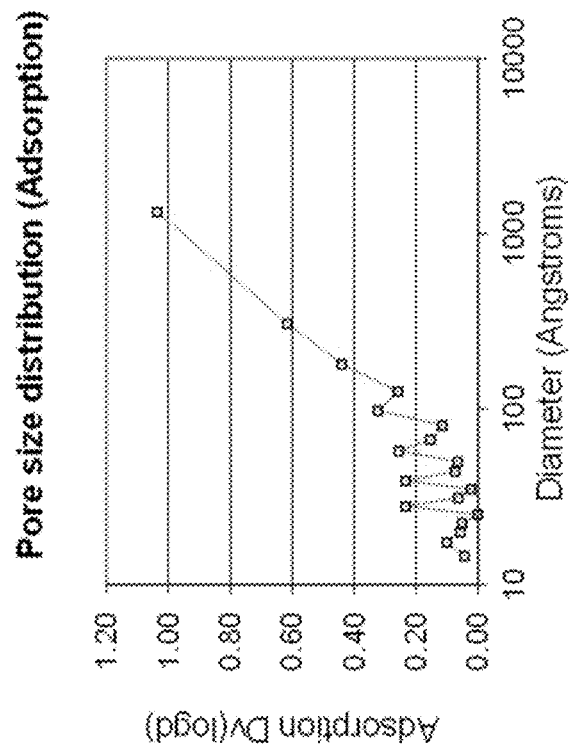
FIGS. 6A and 6B show the isothermal curve and pore size distribution, respectively, of silicon obtained with a $SiO_2$—Al—$ZnCl_2$ system after HCl washing.
Figure 6A:
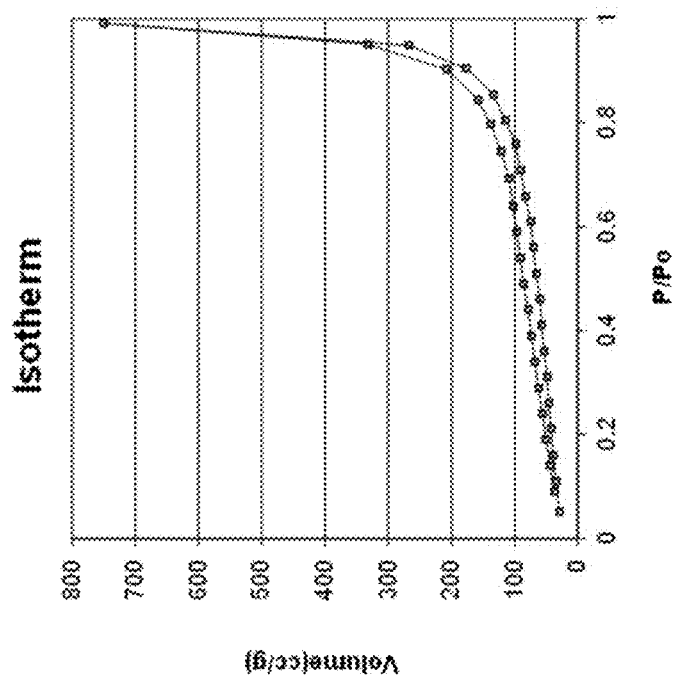

FIGS. 5A and 5B show the isothermal curve and pore size distribution, respectively, of the starting porous $SiO_2$. The $SiO_2$ had a Brunauer-Emmett-Teller (BET) surface area of 100.9 $m^2$/g, a pore volume of 0.98 $cm^3$/g, and an average pore diameter of approximately 30 nm. FIGS. 6A and 6B show the isothermal curve and pore size distribution, respectively, of the Si product. The Si had a BET surface area of 150.9 $m^2$/g, a pore volume of 1.17 $cm^3$/g, and pore diameters >10 nm.

Figure 7:
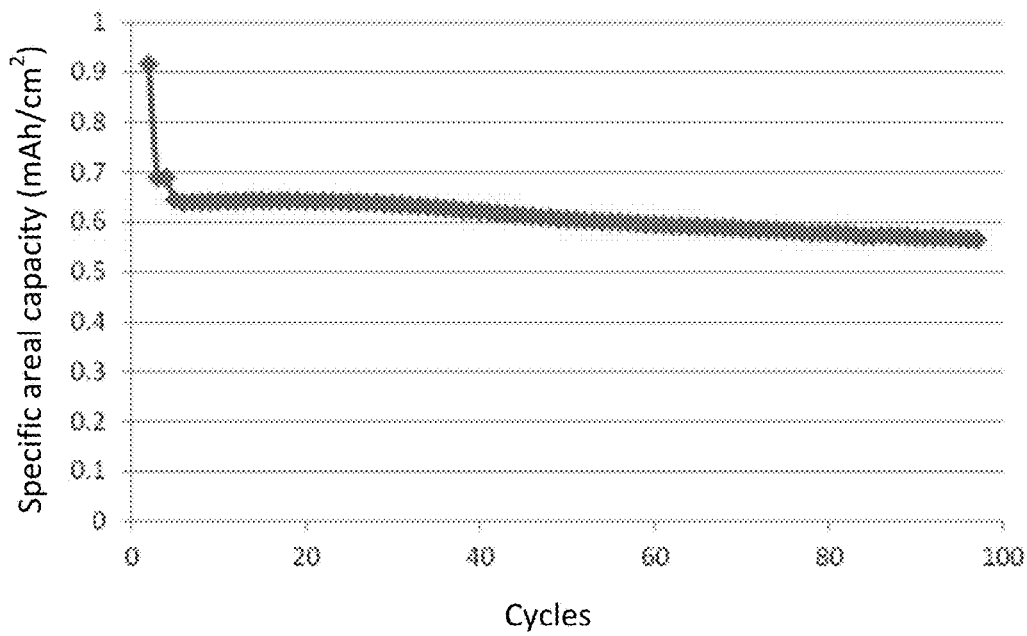
FIG. 7 is a graph of specific areal capacity vs. cycle number for a porous silicon electrode prepared with silicon obtained with a $SiO_2$—Al—$ZnCl_2$ system.
Figure 8:
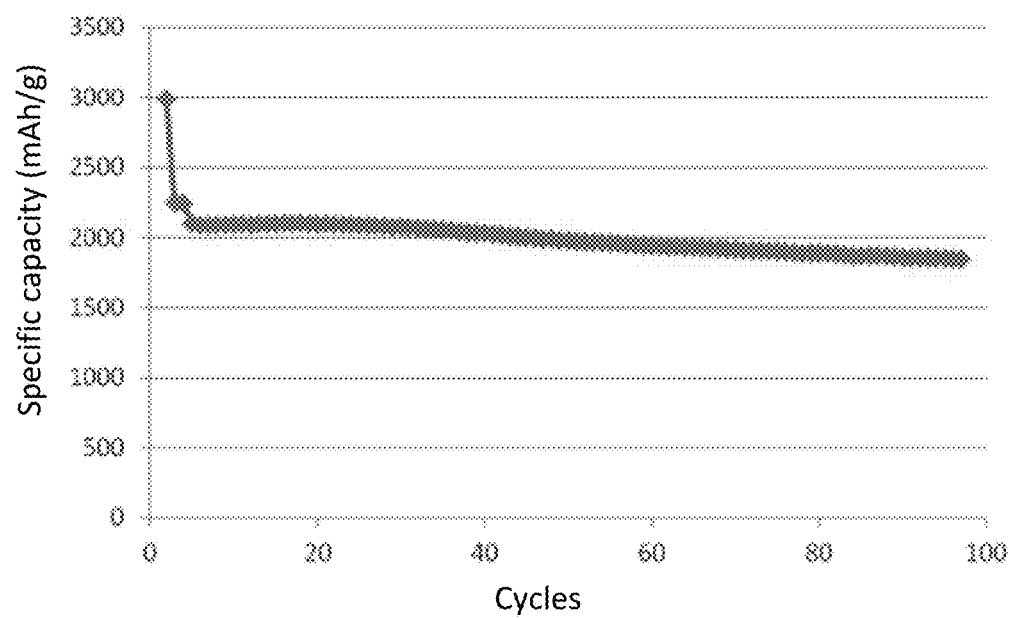
FIG. 8 is a graph of specific capacity vs. cycle number for a porous silicon electrode prepared with silicon obtained with a $SiO_2$—Al—$ZnCl_2$ system.

Electrodes were cycled in coin cells between 0.005V and 1V vs. Li metal. As shown in FIG. 7, the specific areal capacity was ~0.7 mAh/$cm^2$ at the current density of 100 mA/g, and ~0.62 mAh/$cm^2$ at the current density of 1 A/g based on the mass of carbon-coated silicon. The specific capacity was ~2100 mAh/g based on the mass of carbon-coated silicon (FIG. 8). The Si anodes had good cycling stability with the retention of ~85% capacity over 100 cycles. The performance was much better than electrodes comprising conventional nano-Si materials.

Certain representative embodiments of the disclosure are described in the following numbered paragraphs.

1. A method for preparing porous silicon, comprising: forming a mixture comprising (i) porous silica, (ii) a metal comprising aluminum, magnesium, or a combination thereof, and (iii) a metal halide comprising a metal M, where the metal halide has a melting point≤400° C.; heating the mixture in a sealed vessel at a temperature greater than or equal to the melting point of the metal halide and ≤400° C. under an inert atmosphere to form a product comprising porous silicon; and combining the product with acid to remove any by-products from the porous silicon.

2. The method of paragraph 1, wherein the metal M is Ti, Fe, Zn, Ga, Ge, Ag, Sn, Sb, Au, Hg, Tl, Bi, or a combination thereof.

3. The method of paragraph 1, wherein the metal M is Zn, Fe, Sn, Sb, Ti, or a combination thereof.

4. The method of any one of paragraphs 1-3, wherein the metal halide is a metal chloride, metal bromide, metal iodide, or a combination thereof.

5. The method of any one of paragraphs 1-4, wherein the metal halide is a metal chloride.

6. The method of paragraph 5, wherein the metal chloride is $ZnCl_2$, $FeCl_3$, $SnCl_2$, $SbCl_3$, $TiCl_4$, or a combination thereof.

7. The method of paragraph 5, wherein the metal chloride is $ZnCl_2$, $FeCl_3$, $SnCl_2$, or $SbCl_3$, and the mixture is heated at a temperature within a range of from 250° C. to 350° C.

8. The method of any one of paragraphs 1-7, wherein the mixture is heated for a period of time within a range of from one hour to 24 hours to form the porous silicon.

9. The method of any one of paragraphs 1-8, wherein the acid is hydrochloric acid, sulfuric acid, nitric acid, phosphoric acid, acetic acid, or a combination thereof.

10. The method of any one of paragraphs 1-9, wherein the porous silica, the metal comprising aluminum, magnesium, or a combination thereof, and the metal halide comprising the metal M are combined in a molar ratio of 1 mole silica, 2-6 moles metal, and 1-6 moles metal halide.

11. The method of any one of paragraphs 1-9, wherein the metal halide is an iron halide and the porous silica, the metal comprising aluminum, magnesium, or a combination thereof, and the iron halide are combined in a molar ratio of 1 mole silica, 2-6 moles metal, and 0.2-0.3 moles iron halide.

12. The method of any one of paragraphs 1-11, wherein the porous silica has an initial Brunauer-Emmett Teller (BET) surface area as determined by nitrogen adsorption and the porous silicon has a BET surface area within a range of 1.0-1.8X the initial BET surface area of the porous silica.

13. A method for preparing an electrode comprising porous silicon, comprising: forming a mixture comprising (i) porous silica, (ii) a metal comprising aluminum, magnesium, or a combination thereof, and (iii) a metal halide comprising a metal M, where the metal halide has a melting point ≤400° C.; heating the mixture in a sealed vessel at a temperature greater than the melting point of the metal halide and ≤400° C. under an inert atmosphere to form a product comprising porous silicon; combining the product with acid to remove any by-products from the porous silicon; coating the porous silicon with carbon to produce carbon-coated porous silicon; forming a slurry comprising the carbon-coated porous silicon; and drying the slurry to form an electrode.

14. The method of paragraph 13, wherein forming the slurry comprises combining the carbon-coated porous silicon with a binder and water.

15. The method of paragraph 13 or paragraph 14, wherein M is Al, Ti, Fe, Zn, Ga, Ge, Ag, Sn, Sb, Au, Hg, Tl, Bi, or a combination thereof.

16. The method of any one of paragraphs 13-15, wherein the slurry comprises 10-90 wt % carbon-coated silicon based on a total mass of solids in the slurry.

17. The method of any one of paragraphs 13-16, further comprising forming the slurry from the carbon-coated porous silicon, a binder, water, and conductive carbon.

18. The method of paragraph 17, wherein the electrode comprises 60-80 wt % carbon-coated silicon, 0-20 wt % carbon black, and 10-30 wt % binder.

19. The method of any one of paragraphs 13-18, wherein the electrode has:

(i) a reversible specific capacity of 1500-2500 mAh/g at a current density of 1 A/g based on the mass of carbon-coated silicon in the electrode; (ii) a capacity retention of at least 80% over 100 cycles; or (iii) both (i) and (ii).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for preparing porous silicon, comprising:
    forming a mixture comprising (i) porous silica, (ii) a metal comprising aluminum, magnesium, or a combination thereof, and (iii) a metal halide comprising a metal M, where the metal M is Ti, Zn, Ga, Ge, Aq, Sn, Sb, Au, Hq, Tl, Bi, or a combination thereof, and the metal halide has a melting point ≤400° C.;
    heating the mixture in a sealed vessel at a temperature greater than or equal to the melting point of the metal halide and ≤400° C. under an inert atmosphere to form a product comprising porous silicon; and
    combining the product with acid to remove any by-products from the porous silicon.

2. The method of claim 1, wherein the metal M is Zn, Sn, Sb, Ti, or a combination thereof.

3. The method of claim 1, wherein the metal halide is a metal chloride, metal bromide, metal iodide, or a combination thereof.

4. The method of claim 1, wherein the metal halide is a metal chloride.

5. The method of claim 4, wherein the metal chloride is $ZnCl_2$, $SnCl_2$, $SbCl_3$, $TiCl_4$, or a combination thereof.

6. The method of claim 4, wherein the metal chloride is $ZnCl_2$, $SnCl_2$, or $SbCl_3$, and the mixture is heated at a temperature within a range of from 250° C. to 350° C.

7. The method of claim 1, wherein the mixture is heated for a period of time within a range of from one hour to 24 hours to form the porous silicon.

8. The method of claim 1, wherein the acid is hydrochloric acid, sulfuric acid, nitric acid, phosphoric acid, acetic acid, or a combination thereof.

9. The method of claim 1, wherein the porous silica, the metal comprising aluminum, magnesium, or a combination thereof, and the metal halide comprising the metal M are combined in a molar ratio of 1 mole silica, 2-6 moles metal, and 1-6 moles metal halide.

10. The method of claim 1, wherein the porous silica has an initial Brunauer-Emmett Teller (BET) surface area as determined by nitrogen adsorption and the porous silicon has a BET surface area within a range of 1.0-1.8X the initial BET surface area of the porous silica.

11. A method for preparing porous silicon, comprising:
    forming a mixture comprising (i) porous silica, (ii) a metal comprising aluminum, magnesium, or a combination thereof, and (iii) an iron halide having a melting point ≤400° C.;
    heating the mixture in a sealed vessel at a temperature greater than or equal to the melting point of the iron halide and ≤400° C. under an inert atmosphere to form a product comprising porous silicon; and
    combining the product with acid to remove any by-products from the porous silicon, wherein the porous silica, the metal comprising aluminum, magnesium, or a combination thereof, and the iron halide are combined in a molar ratio of 1 mole silica, 2-6 moles metal, and 0.2-0.3 moles iron halide.

12. The method of claim 11, wherein the iron halide is $FeCl_3$.

* * * * *